United States Patent [19]

Myhre

[11] Patent Number: 5,346,709
[45] Date of Patent: Sep. 13, 1994

[54] PROCESS FOR THE PRODUCTION OF A MARINE OIL PREPARATION

[75] Inventor: Johan Myhre, Oslo, Norway

[73] Assignee: ScanHall A.S., Oslo, Norway

[21] Appl. No.: 842,194

[22] PCT Filed: Sep. 12, 1990

[86] PCT No.: PCT/NO/0000140

§ 371 Date: Apr. 14, 1992

§ 102(e) Date: Apr. 14, 1992

[87] PCT Pub. No.: WO91/03943

PCT Pub. Date: Apr. 4, 1991

[30] Foreign Application Priority Data

Sep. 18, 1989 [NO] Norway .................. 893708

[51] Int. Cl.$^5$ .............. A23D 7/00; A23L 1/24; B65B 31/02; B65D 85/72

[52] U.S. Cl. .................. 426/111; 426/115; 426/129; 426/131; 426/394; 426/397; 426/410; 426/602; 426/643; 426/654

[58] Field of Search ............ 426/392, 394, 397, 404, 426/410, 602, 654, 111, 115, 129, 131, 643

[56] References Cited

U.S. PATENT DOCUMENTS 4,356,935 11/1982 Kamin .................. 222/1
4,826,702 5/1989 Hayashi et al. .................. 426/589

FOREIGN PATENT DOCUMENTS 668727 8/1965 Belgium .
298293 1/1989 European Pat. Off. .
304115 2/1989 European Pat. Off. .
1929589 12/1969 Fed. Rep. of Germany ...... 426/397
2607654 9/1976 Fed. Rep. of Germany .
3202275 8/1983 Fed. Rep. of Germany .
573718 6/1924 France .

OTHER PUBLICATIONS

Derwent Abstract No. 78-71270A (1978).
Mendele, At Very Least, Fist Oil Makes Sales Healthy, Newday, Nov. 3, 1986, at III 5.

*Primary Examiner*—Leo B. Tentoni
*Attorney, Agent, or Firm*—Birch, Stewart, Kolasch & Birch

[57] ABSTRACT

The present invention is directed to a process for producing a marine oil preparation, in the form of an oil-in-water emulsion, with the viscosity of mayonnaise, containing 22 to 90% by weight of cod-liver oil or other marine oils, or concentrates of such oils, where the emulsion is filled into containers made of an air-resistant material and which follows closely the contents during and after dosage so that no air space arises and therefore no oxidation of the preparation occurs. The production process occurs preferably under an inert gas atmosphere.

26 Claims, No Drawings

PROCESS FOR THE PRODUCTION OF A MARINE OIL PREPARATION

BACKGROUND OF THE INVENTION

This invention relates to a method for the production of a preparation consisting mainly of marine oils, which in combination with an air-tight container or tube is protected from oxidation under dosed usage. The specific composition and viscosity of the preparation cause the typical marine oil and fishy taste to be virtually eliminated, and make it easy to add different flavoring agents.

DESCRIPTION OF THE RELATED ART

Cod-liver oil has been known and used for many years as a valuable preparation due to its vitamin contents, and has recently awakened new interest due to its high content of polyunsaturated fatty acids.

Newly produced cod-liver oil has a bland taste which remains unchanged as long as it is not exposed to oxidation. Cod-liver oil containers are therefore either hermetically sealed, vacuum-packed or filled with an inert gas.

The most common way of distributing cod-liver oil has, up to now, been by using bottles. Daily use allows entry of air into the bottle with resulting oxidation and rancid taste. Gelatin capsules are also used, but this increases product cost considerably.

Cod-liver oil has been manufactured as an emulsion (cf., e.g., Remingtons Practice of Pharmacy; Martin and Cook, Easton, Pa., 1956, page 297 and 1092, and Norwegian Pharmacopoeia 1913, page 106, as well as Commentary to the Norwegian Pharmacopoeia 1919, page 152) but mainly as a pharmacy product made to order and only with a view to improving the taste of the cod-liver oil, which in the 1930's was already heavily oxidized before packing due to the methods of production used then. It was sold in bottles and had a thin consistency. Such emulsions are very vulnerable to oxidation, and have therefore not been the subject of commercialization.

SUMMARY OF THE INVENTION

Included in the term "cod-liver oil" in this connection are also marine oils other than cod-liver oil and or concentrations of these, particularly with a view to a higher content of omega-3-fatty acids than in normal cod-liver oil or marine oils.

The objective of this invention is to provide a method that prevents marine oil from oxidizing during production, packaging and distribution, and also later when being used by the consumer. This objective is attained, if desired, without the use of antioxidants.

In addition, it is an objective of the present invention to produce a multivitamin preparation in which cod-liver oil provides vitamins A and D (and perhaps vitamin E). In the aqueous phase water-soluble vitamins are to be added in such amounts that when a daily dose of the preparation is taken for the polyunsaturated fatty acids, a daily dose of vitamins is taken at the same time. If marine oils with a lower content of vitamins than in cod-liver oil are used, then vitamins A, E and D also have to be added.

Another objective is to add flavor to the marine oil preparation so that the fishy taste is masked or eliminated, and so that aftertaste and regurgitation is prevented.

A further objective is to produce a marine oil preparation with an appetizing appearance similar to that of mayonnaise. Mayonnaise is also the flavor that is aimed at in the objective.

Finally, the last objective is to produce a marine oil preparation which can be used during meal times on salads or sandwiches, in the same way as mayonnaise or salad dressing. It is intended that the preparation will be used particularly on sea foods.

The objectives of the invention are achieved by preventing oxidation of the marine oil preparation by making an oil-in-water emulsion preferably in an inert atmosphere of nitrogen. Advantages of a preparation produced in accordance with the invention are as follows:

1. The thick, paste consistency makes the preparation easy to apply on food, e.g. bread or fish, and therefore used in the same way as mayonnaise.
2. The marine oil concentration in the preparation is high, viz. 80–90%.
3. The flavor of the preparation can be varied, e.g. by admixing spice, sugar, etc., or even fish or shellfish. Such admixtures will mask the characteristic marine oil flavor.
4. The flavor impact appears far more favorable than that obtained using a thin emulsion.
5. The oil-in-water emulsion masks the oiliness by being readily dispersible in saliva and gastric juices.
6. In addition to the inherent fat-soluble vitamins, water-soluble vitamins can be added to the preparation.

DETAILED DESCRIPTION OF THE INVENTION

In the following will be presented examples of the production process in accordance with the invention. The process is carried out as for the production of mayonnaise on a small or large scale, but an in inert atmosphere of $N_2$ or $CO_2$. In this way an oil-in-water emulsion can be produced either with 66–88% by weight of marine oil or marine oil concentrates or mixture of such oils, or the amount of oil calculated to give 19–25% by weight of polyunsaturated fatty acids in the form of the same oils.

According to many literature sources (cf., e.g. Aril Chr. Rustan and Christian A. Drevon, Institute for Nutrition Research, Oslo University (Sandoz Information No. 1/89), cod-liver oil contains approximately 27% by weight of polyunsaturated fatty acids, approximately 9% of which are eicosapentanoic acid and 14% approximately of which are docosahexanoic acid.

The water used in the production process must be, as far as possible, without air and boiled under vacuum.

The emulsion is filled to the top into tubes and/or soft plastic containers that are air-resistant and collapse proportionally to the amount of preparation left after each dosage, no matter how many doses, so that no air space arises inside the container and no oxidation occurs during extended use. Alternatively, it can be filled into stiff containers, which, by using a screw or piston-like device, reduce in volume accordingly with each expressed dose of the emulsion.

EXAMPLE 1

| Constituents | Weight |
| --- | --- |
| Cod-liver oil | 800 g |
| Egg yolk | 50 g |
| Lemon oil | 10 g |
| Sugar | 55 g |
| Salt | 10 g |
| Citric acid | 20 g |
| Water, air-free | 40 g |
| Pepper | 10 g |
| Preservatives E 211, E 202, E 218 | 5 g |
| | 1000 g |

The recommended daily dosage of 7.5 g contains 9.75 micrograms vitamin A (3250 I.U.) and 10 micrograms vitamin D (400 I.U.).

EXAMPLE 2

| Constituents | Weight |
| --- | --- |
| Marine oil concentrate with 36% omega-3-fatty acids | 600 g |
| Egg yolk | 50 g |
| Lemon oil | 5 g |
| Sugar | 95 g |
| Smoked mackerel | 125 g |
| Citric acid | 10 g |
| Water, air-free | 100 g |
| Pepper | 10 g |
| Preservatives E 211, E 202, E 218 | 5 g |
| | 1000 g |

Recommended daily dose: 7.5 g.

EXAMPLE 3

As in example 2, but with 125 g smoked cod roe instead of 125 g smoked mackerel.
Recommended daily dose: 7.5 g.

EXAMPLE 4

| Constituents | Weight |
| --- | --- |
| Salmon oil | 800 g |
| Egg yolk | 50 g |
| Smoked salmon | 50 g |
| Salt | 10 g |
| Citric acid | 10 g |
| Vinegar, 20% | 10 g |
| Pepper | 5 g |
| Sugar | 30 g |
| Water, air-free | 25 g |
| Preservative | 5 g |
| | 1000 g |

EXAMPLE 5

As for example 1, but with the following added:

| Contents in daily dose, 7.5 g | | |
| --- | --- | --- |
| Vitamin C | 5000 mg | 30.0 mg |
| Thiamin ($B_1$) | 200 mg | 1.5 mg |
| Riboflavin ($B_2$) | 240 mg | 1.8 mg |
| Niacin | 1300 mg | 10.0 mg |
| Vitamin B | 280 mg | 2.0 mg |
| Vitamin E | 1000 mg | 7.5 mg |

I claim:

1. A process for the preparation of a marine oil preparation, comprising
   (a) forming an oil-in-water emulsion comprising at least one marine oil, marine oil concentrate, or mixtures thereof, wherein said marine oil, marine oil concentrate, or mixture thereof comprises a fatty acid consisting essentially of omega-3 polyunsaturated fatty acids, in an amount sufficient to provide a mayonnaise-type emulsion or paste, under an inert atmosphere; and
   (b) completely filling said oil-in-water emulsion into a container of an airtight material, wherein said container collapses proportionally to the amount of said marine oil preparation remaining after a portion of said marine oil preparation is dispensed, wherein no air space forms in said container after said dispensing, and wherein no discernible oxidation occurs during the storage and use of said marine oil preparation.

2. The process of claim 1, wherein said oil-in-water emulsion comprises 22 to 90% by weight of said marine oil, marine oil concentrate, or mixtures thereof.

3. The process of claim 2, wherein said oil-in-water emulsion comprises 60 to 90% by weight of said marine oil, marine oil concentrate, or mixtures thereof.

4. The process of claim 3, wherein said oil-in-water emulsion comprises 66 to 88% by weight of said marine oil, marine oil concentrate, or mixtures thereof.

5. The process of claim 1, wherein said marine oil is cod-liver oil, and wherein said marine oil concentrate is cod-liver oil concentrate.

6. The process of claim 1, further comprising adding water-soluble vitamins to the aqueous phase of said oil-in-water emulsion prior to said filling step.

7. The process of claim 1, further comprising adding oil-soluble vitamins to the oily phase of said oil-in-water emulsion prior to said filling step.

8. The process of claim 1, wherein said air-tight material is a soft plastic.

9. The process of claim 1, wherein said container is a tube.

10. The process of claim 1, wherein said container comprises a stiff, static container with a piston or screw for dispensing said marine oil preparation.

11. The process of claims 1 or 5, wherein the proportion of polyunsaturated fatty acids in said emulsion is from 19–25% by weight.

12. The process of claim 1, wherein said inert atmosphere is selected from the group consisting of $N_2$ and $CO_2$.

13. A process for the dispensing of a marine oil preparation, comprising:
   (a) forming an oil-in-water emulsion comprising at least one marine oil, marine oil concentrate, or mixtures thereof, wherein said marine oil, marine oil concentrate, or mixture thereof comprises a fatty acid consisting essentially of omega-3 polyunsaturated fatty acids, in an amount sufficient to provide a mayonnaise-type emulsion or paste, under an inert atmosphere;
   (b) completely filling said oil-in-water emulsion into a container of an airtight material to obtain said marine oil preparation; and
   (c) removing a portion of said marine oil preparation from said container and collapsing said container proportionally to the amount of said marine oil preparation remaining after said portion of said marine oil preparation is removed, wherein no air space forms in said container after said removing, and wherein no discernible oxidation occurs during the storage and use of said marine oil preparation.

14. The process of claim 13, wherein said oil-in-water emulsion comprises 22 to 90% by weight of said marine oil, marine oil concentrate, or mixtures thereof.

15. The process of claim 14, wherein said oil-in-water emulsion comprises 60 to 90% by weight of said marine oil, marine oil concentrate, or mixtures thereof.

16. The process of claim 15, wherein said oil-in-water emulsion comprises 66 to 88% by weight of said marine oil, marine oil concentrate, or mixtures thereof.

17. A marine oil product comprising a container formed of an airtight material, and inside said container, a marine oil mayonnaise-type emulsion or paste, comprising an oil-in-water emulsion, wherein said oil is a marine oil, marine oil concentrate, or a mixture thereof, wherein said marine oil, marine oil concentrate, or mixture thereof comprises a fatty acid consisting essentially of omega-3 polyunsaturated fatty acids, and wherein said tube or container is arranged to collapse during use proportionally to the amount of said marine oil mayonnaise-type emulsion or paste remaining after a portion of said marine oil preparation is dispensed from said container, wherein no air space forms in said container after said dispensing, and wherein no discernible oxidation occurs during the storage and use of said marine oil mayonnaise-type emulsion or paste.

18. The product according to claim 17, wherein said air-tight material is a soft plastic.

19. The product according to claim 17, wherein said container is a tube.

20. The product according to claim 17, wherein said container comprises a stiff, static container with a piston or screw for dispensing said marine oil preparation.

21. The product according to claim 17, wherein the aqueous phase of said oil-in-water emulsion further comprises added water-soluble vitamins.

22. The product according to claim 17, wherein the oily phase of said oil-in-water emulsion further comprises added oil-soluble vitamins.

23. The product according to claim 17, wherein said oil-in-water emulsion comprises 22 to 90% by weight of said marine oil, marine oil concentrate, or mixtures thereof.

24. The product according to claim 23, wherein said oil-in-water emulsion comprises 60 to 90% by weight of said marine oil, marine oil concentrate, or mixtures thereof.

25. The product according to claim 24, wherein said oil-in-water emulsion comprises 66 to 88% by weight of said marine oil, marine oil concentrate, or mixtures thereof.

26. The product according to claim 17, wherein the proportion of polyunsaturated fatty acids in said oil-in-water emulsion is from 19 to 25% by weight.

* * * * *